United States Patent [19]
Clayton et al.

[11] 3,761,795
[45] Sept. 25, 1973

[54] BATTERY CHARGING APPARATUS
[75] Inventors: Dennis Albert Clayton, Gawsworth; George William Foster, Bolton, both of England
[73] Assignee: Legg (Industries) Limited, Wolverhampton, Staffordshire, England
[22] Filed: Jan. 13, 1972
[21] Appl. No.: 217,572

[52] U.S. Cl............... 320/20, 320/21, 320/37, 320/39
[51] Int. Cl.............................................. H02j 7/10
[58] Field of Search .................. 320/20, 21, 37, 39, 320/40

[56] References Cited
UNITED STATES PATENTS
3,517,294  6/1970  Ruben.............................. 320/39 X
3,624,481  11/1971  Macharg............................. 320/39

Primary Examiner—J. D. Miller
Assistant Examiner—Robert J. Hickey
Attorney—Watson, Cole, Grindle & Watson

[57] ABSTRACT

Automatic electric battery charging apparatus includes means for tempararily interrupting the charging current for periods, referred to as open-circuit intervals, the duration of each of which depends on the fall of battery voltage during the open-circuit interval. A capacitor responsive to the duration of the open-circuit intervals is provided. The capacitor is alternately charged and discharge, through at least one constant current device, respectively during successive open-circuit intervals, from a predetermined high limiting state in one direction. If, during a subsequent open-circuit interval after the capacitor has been partially discharged it fails to be recharged to the high limit at least a phase of the charge is terminated.

25 Claims, 3 Drawing Figures

BATTERY CHARGING APPARATUS

This invention relates to automatic battery charging apparatus and is an improvement in or modification of that set forth in the present applicants' British Patent specification No. 1,233,186.

That specification describes and claims automatic electric battery charging apparatus including means for temporarily interrupting the charging current for periods, which may be referred to as open-circuit intervals, whereof the duration depends on the fall of battery voltage during the open-circuit interval, and means, responsive to a function of the duration of the open-circuit intervals, for finally interrupting or modifying the charging circuit to determine the charge, or a phase of the charge. In one arrangement the charge, or a phase of the charge, is terminated when the ratio of the duration of an open-circuit interval to that of a preceding open-circuit interval is below a predetermined value. In the arrangement specifically described (with reference to FIG. 2 of that specification) this comparison is made by means of a reversible timer having a motor which runs more slowly in one direction than in the other. An object of the present invention is to provide an arrangement that does not require a motor capable of running at different speeds.

According to the present invention automatic electric battery charging apparatus including means for temporarily interrupting the charging current for periods, which may be referred to as open-circuit intervals, the duration of each of which depends on the fall of battery voltage during the open-circuit interval, includes means responsive to the duration of the open-circuit intervals including a capacitor, means for alternately charging and discharging it respectively during successive open-circuit intervals, from a predetermined limiting state in one direction and means for detecting if it has failed to return to that limit to initiate termination of at least a phase of the charge.

The limiting state of charge of the capacitor may be a low limit, e.g. a discharged state, but preferably it is a high limit, and the termination is initiated if the capacitor, having been partially discharged in one open-circuit interval, fails, during the next open-circuit interval, to be recharged to that high limit. This has the advantage that if capacitor leakage should occur the battery charge will tend to be terminated or modified early rather than prolonged indefinitely and this is the safer mode of failure, being less liable to damage the battery.

Preferably the capacitor is charged and discharged through at least one constant current device. In particular it may be charged and discharged through the same constant current device.

In addition the apparatus preferably includes a maximum time switching circuit serving to initiate termination if the duration of an open-circuit interval exceeds a predetermined maximum irrespective of the ratio between the durations of successive open-circuit intervals. The maximum time switching circuit may respond to the capacitor being discharged beyond a predetermined minimum limiting state of charge.

Conveniently the voltage level of the capacitor is detected by a balanced voltage level comparator including a long-tailed pair of transistor stages, whereof one side is fed from the capacitor connected to a constant current device including a transisitor, while the other side is fed from a circuit including a similar transistor connected to a constant voltage source.

Preferably the apparatus includes a charge switching device to switch off the charging current at the end of each of a series of timed charging periods, and to switch it on and to terminate the open-circuit interval when the open-circuit battery voltage falls below a predetermined value.

The apparatus also preferably includes a bistable switching device arranged to assume one state during odd open-circuit intervals and the other state during even open-circuit intervals. Conveniently the bistable circuit includes a thyristor in parallel with a transistor and both in series with a relay having a change-over contact arranged to change-over an input pulse-signal from the thyristor gate, where it causes the signal to fire the thyristor, to the transistor base, where it causes the transistor to short-circuit the thyristor and cause it to cut off.

The bistable switching device may be controlled by signals emitted by a charge timer at the end of each timed charging period, successive signals serving to switch it in opposite directions, while the charge switching device is also controlled by signals from such a charge timer which will always switch it in the same direction, intervening signals being received from a voltage comparator to switch it in the opposite direction. The voltage comparator conveniently includes a Schmitt trigger circuit.

The bistable switching device may be arranged to connect the capacitor to a constant current network and to a supply so as to be charged or discharged in one direction from its limiting state during odd open-circuit intervals, and in the opposite direction towards that limiting state during even open-circuit intervals.

The charge switching device is preferably arranged to switch off the capacitor charging or discharging circuit during charging periods when it would be receding from the limiting state but not during charging periods when it would be approaching that state.

The charge switching device conveniently controls the means for terminating a phase of the charge so that it can only occur during a charging period. In addition such means are preferably controlled by a switching device, e.g. a thyristor arranged to be switched on by the charge timer at the end of the first charging period to prevent it from functioning during that period but permit it to function any time thereafter.

The battery charge timer may include a unijunction transistor having its input coupled to a resistor capacitor network.

The termination of a phase of the charge may be under the control of a latching circuit including a first latching relay energised from an A.C. supply and having a holding contact and a second latching relay energised from the battery and having a holding contact in parallel with that of the first latching relay.

Conveniently termination of the first pahse initiates a second pahse during which as in the first phase charging current flows for predetermined periods at the end of each of which it is switched off for an open-circuit interval which terminates when the open-circuit battery voltage falls below a predetermined value, the average charging current being substantially less than in the first phase. During the second phase the time of a charging period is less than that in the first phase, and is controlled by the same timer in which the value of a component in a resistor capacitor network is changed. In addition the level of voltage is preferably less than in the first phase and is controlled by the same battery voltage level detector in which the value of a component is changed.

The apparatus may be provided with a relay arranged to switch on the A.C. supply only when a battery is connected to the charging terminals. In addition it may have a switch-on delay circuit to delay the switching on of the A.C. supply to allow time for a charging plug to be pushed fully home before charging begins.

The invention may be put into practice in various ways but one specific embodiment will be described by way of example with reference to the accompanying drawing in which the single FIGURE (which is shown divided into three portions, i.e.

Before describing the circuit in detail it will be convenient to summarize the operation briefly. The charge occurs in two phases of which the first or phase one is the main charge, with which the present invention is primarily concerned, and phase two is a topping up charge which can be continued indefinitely. During phase one the charging current is switched on for predetermined time intervals, e.g. a quarter of an hour, and at the end of each interval it is switched off, and the voltage of the battery on open circuit is monitored by a voltage level detector, and when it falls to a predetermined value, e.g. 2.3 volts per cell in the case of a lead acid battery, the charging current is switched on again. Meanwhile a time comparator circuit compares the durations of successive open-circuit intervals, e.g. comparing each odd interval with the succeeding even interval. When the duration of open-circuit intervals becomes substantially constant, indicating that the battery is substantially fully charged, it causes the circuit to terminate phase one of the charge and switch over to phase two, which can continue indefinitely.

Thus during the first charging period before the first open-circuit interval, and before subsequent odd intervals, a low-leakage (e.g. polycarbonate) capacitor is charged to a predetermined voltage, limited e.g. by a zener diode, and this voltage is held constant. During the first and all odd open-circuit intervals the capacitor is discharged at a controlled rate, e.g. at constant current, and is then left on open-circuit during the next battery charging period. During the second and all even open-circuit intervals the capacitor is charged again at a controlled rate which is less than the rate of discharge of the capacitor by a constant percentage, say X per cent. Thus if the duration of the even open-circuit interval fails to exceed that of the previous odd open-circuit interval by at least X percent the capacitor voltage will return to the value previously limited by the zener diode, and this is detected, by a voltage level detector, and produces a signal to ensure that the battery charge is continued. In the absence of such a signal the battery charge is terminated or modified, e.g. the charger is switched over to the phase two mode.

The circuit will now be described in more detail.

The main charging circuit shown in FIG. B, of the diagram, may be on any conventional form and is shown as comprising A.C. terminals 10 and 11 connected through the contact 12/1 of a main contactor 12 to the primary winding 15 of a transformer 14 having its secondary winding 16 connected to the input of a main bridge rectifier 17. The output of this rectifier 17 is connected to charger output terminals 19 and 20 which are connected to the terminals of a battery 21.

The arrangement incorporates five relays which it will be convenient briefly to identify. A supply relay 22 (shown in FIG. 1B) is energised whenever a battery is connected to the battery terminals. A charge relay 23 (shown in FIG. 1C) is energised whenever battery charging current is to be supplied. An odd-even relay 24 (shown in FIG. 1C) is energised by a bistable circuit during odd open-circuit intervals but not during even open-circuit intervals. A phase 2 first latch relay 25 (shown in FIG. 1C) is energised and holds itself when phase two of the charge is introduced. A phase two second latch relay 26 (shown in FIG. 1C) is energised with the phase two first latch relay 25, to provide a holding circuit for the latter if the alternating supply should be temporarily switched off, so as to ensure that in there circumstances when it is switched on again the charger will continue in phase two and will not revert to phase one.

Thus it will be seen that the supply relay 22 is connected through a diode 29 and a resistor 30 across the battery terminals 19 and 20 so as to be energised whenever a battery is connected to them. The alternating supply terminals 10 and 11 are also connected to the primary winding 5 of a transformer 4 for supplying the control circuits. This has a secondary winding 6 connected to a red indicating lamp 33 and also, through contacts 22/1 and 25/1 to a green or an amber lamp 34 or 35 and to the input of a bridge rectifier 7. Thus the output 185 of this bridge rectifier 7 is connected through a resistor 38 across a smoothing capacitor 39 the terminals 40 and 41 of which form positive and negative supply terminals for a switch-on delay circuit 45, a battery voltage level detector circuit 55, a charge timer circuit 85, a bistable circuit 105 and a phase two latch circuit 114 shown in FIG. 1C of the diagram. The output 185 of the bridge rectifier 7 (shown in FIG. 1B) is also connected through a diode 128 and a resistor 129 across a smoothing capacitor 130 (shown in FIG. 1A), and the terminals of the latter are connected through a resistor 131 across a zener diode 132 the terminals 133 and 41 of which form voltage stabilised supply terminals for a maximum time switch circuit 137, a time comparator circuit 147, a voltage level detector circuit 160, and a phase 2 change over logic circuit 175 (shown in FIG. 1A).

It will be seen that in the battery voltage level detector circuit 55 (shown in FIG. 1C) the charge relay 23, shunted by a diode 56 is connected through a charge transistor 57, a switch on delay transistor 46 and a resistor 47 across the supply terminals 40 and 41.

Figure 1A:
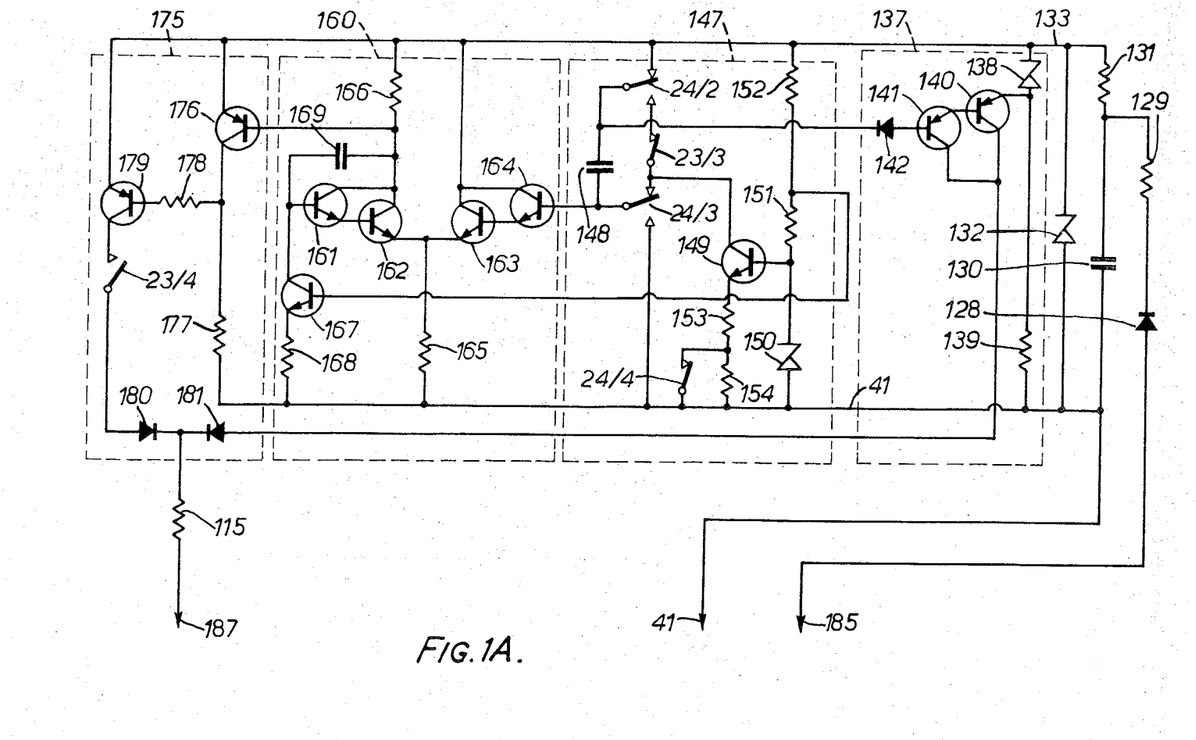
FIGS. 1A, 1B and 1C) is a circuit diagram of an automatic battery charging apparatus similar in principle to that set forth in the prior specification referred to above, but employing a capacitor which is discharged and charged in successive open-circuit intervals, to compare their durations.
Figure 1B:
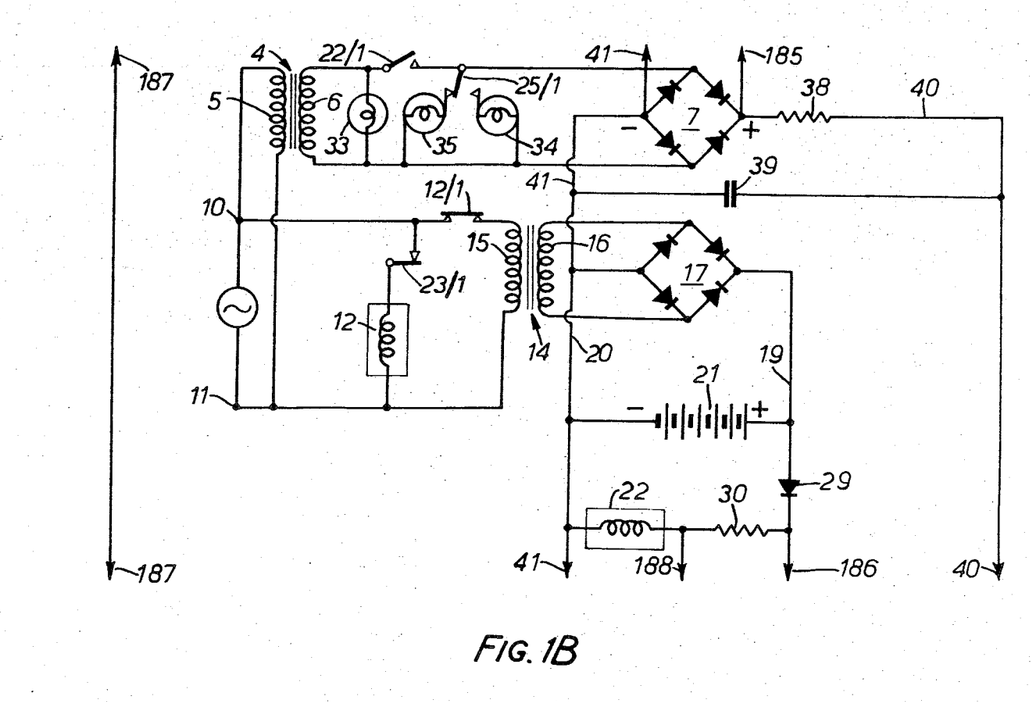
Figure 1C:
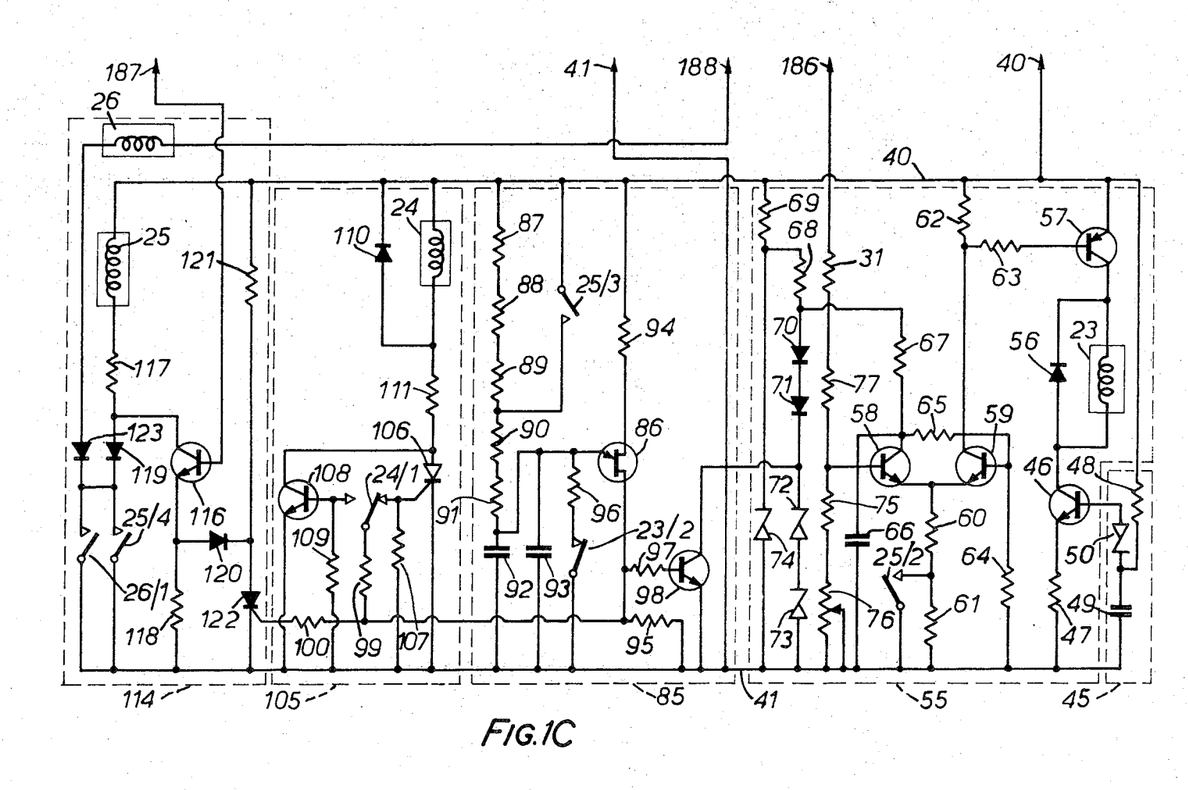

Referring first to the switch-on delay circuit 45, which is shown in FIG. 1C, it will be seen that this comprises a resistor capacitor network 48/49 connected across the supply terminals 40 and 41 and having its junction connected through a zener diode 50 to the base of the transistor 46. The purpose of this is to provide an initial delay of a few seconds when the charger is put into operation by the plugging in of a battery, so that there can be no danger of the charging current being switched on before the plug is fully home. The transistor 46 will not conduct until the capacitor 49 has charged up through the resistor 48 to a voltage exceeding that of the zener diode 50.

The battery-voltage level detector circuit 55, which is shown in FIG. 1C, incorporates a Schmitt trigger circuit comprising a pair of transistors 58 and 59 sharing a common emitter resistor 60 and 61 of which the portion 61 is shunted by a relay contact 25/2 in order to alter the voltage level of operation in phase two. The collector of the transistor 59 is connected through a resistor 62 to the positive supply terminal 40 and through a resistor 63 to the base of the charge transistor 57 whose emitter is connected to the positive supply terminal 40. Thus if the transistor 59 conducts, the charge transistor 57 will also conduct, and (subject to the initial delay) the charge relay 23 will be energised. The base of the transistor 59 is connected through a resistor 64 to the negative supply terminal 41 and through a resistor 65 to the collector of the transistor 58 which is also connected through a capacitor 66 to the negative supply terminal 41 and through a resistor 67, a resistor 68 and a resistor 69 to the positive supply terminal 40. The junction of the resistors 67 and 68 is connected through a pair of temperature compensating diodes 70 and 71 and a pair of zener diodes 72 and 73 to the negative supply terminal 41 and the junction of the resistors 68 and 69 is connected through a zener diode 74 to the negative terminal supply 41. The base of the transistor 58 is connected to the negative supply terminal 41 through resistors 75 and 76 of which the latter is variable, and is also connected through a resistor 77 and a resistor 31 and thereafter through a conductor 186 and the diode 29 (shown in FIG. 1B) to the positive battery terminal 19.

Accordingly the base of the transistor 59 is normally held at a constant voltage, stabilised by the zener diodes 72, 73 and 74 and the diodes 70 and 71, whereas the base of the transistor 58 is at a voltage depending upon that of the positive battery terminal 19, the two emitters being connected together. The potentiometer 76 is adjusted so that so long as the battery voltage is greater than 2.3 volts per cell (in the case of a lead acid battery) the transistor 58 will conduct and the transistor 59 will be cut off; but when it falls below that value the transistor 58 will cut off and the transistor 59 will conduct, thereby energising the charge relay 23. The changeover occurs with a trigger action in a well known manner.

The values of the resistors 60 and 61 are chosen so that when the latter is short-circuited by the contact 25/2 in phase two the voltage level at which the charging relay is switched on will be reduced from 2.3 volts per cell to say 2.2 volts per cell.

The values of the resistors are chosen to give a wide range between the low and high input voltage levels required for operation in opposite directions. Thus whereas the cahrge relay will be switched on at a battery voltage below 2.3 volts per cell it is arranged only to be switched off at a battery voltage above 3.2 volts per cell.

This provides the facility that if the battery is disconnected the charger will produce peak voltages in excess of 3.2 volts per cell, and hence the charge relay will be switched off.

Normally, however, as descirbed below, the charge relay is switched off by the charge timer, which virtually short-circuits the zener diodes 72 and 73, momentarily reducing the operating input voltage level to a low value.

The charge timer circuit 85, which is shown in FIG. 1C, comprises a unijunction transistor 86 controlled by a resistor capacitor network. The resistor capacitor network comprises resistors 87, 88, 89, 90 and 91 and capacitors 92 and 93 with their junction connected to the emitter of the unijunction transistor 86, which has a positive base connected through a resistor 94 to the positive supply terminal 40, and a negative base connected through a resistor 95 to the negative supply terminal 41. The negative base forms an output terminal for three outputs which will be referred to shortly. The resistors 87, 88 and 89 are shunted by a relay contact 25/3 of the phase two first latch relay 25 so as to alter the duration of each battery charging period from say a quarter of an hour in phase one to say 5 minutes in phase two. The capacitors 92 and 93 are shunted by a resistor 96 in series with a contact 23/2 of the charge relay 23 so as to discharge the charge timing capacitors in readiness for another timing operation when the charge relay is de-energised, that is to say during the open-circuit intervals.

One output from the charge timer 85 is connected to the battery voltage level detector 55. Thus the negative base of the unijunction transistor 86 is connected through a resistor 97 to the base of a transistor 98 connected in parallel with the zener diodes 72 and 73. Thus when battery charging current has been flowing for a predetermined period, say a quarter of an hour, the capacitors 92 and 93 will have charged up to a voltage sufficient to fire the unijunction transistor 86. Thus a pulse of current will flow and will cause the transistor 98 to conduct, thereby virtually short-circuiting the zener diodes 72 and 73 and reducing the high operating level of the Schmitt trigger to a low value as described above. This will cause the transistor 59 to cut off and the transistor 58 to conduct, switching back the Schmitt trigger circuit to its initial state and de-energising the charge relay 23.

A second output from the unijunction transistor 86 is taken to the bistable circuit 105.

The bistable circuit 105, which is shown in FIG. 1C, is arranged to switch over to and fro each time the unijunction transistor 86 conducts. Thus the negative base of the unijunction transistor 86 is also connected through a resistor 99 to a two-way relay contact 24/1 of which one contact is connected to the gate of a thyristor 106 which is also connected through a resistor 107 to the negative supply terminal 41. The other contact is connected to the base of a transistor 108, which is also connected through a resistor 109 to the negative supply terminal 41. The thyristor is connected in parallel with the transistor 108 and both are in series with the odd-even relay coil 24 (which is shunted by a diode 110) and with a resistor 111, across the supply terminals 40 and 41.

Accordingly with the contact 24/1 in the position shown, in which it is connected to the thyristor gate terminal, a pulse from the unijunction transistor 86 will fire the thyristor 106 and energise the odd-even relay 24. The contact 24/1 will thereupon change over to the base of the transistor 108. The thyristor 106 will continue to conduct, and the odd-even relay 24 will continue to be energised, throughout the ensuing open circuit interval and the ensuiing charge period and indeed until there is another output pulse when the unijunction transistor fires again at the beginning of the next open circuit interval.

On this occasion, with the contact 24/1 connected to the transistor 108, the pulse will cause this transistor to conduct and virtually short-circuit the thyristor, and as the latter now has no gating signal supplied to its gate it will stop conducting when the voltage across it falls, and will not resume conducting when the transistor 108 again ceases to conduct. Hence the odd-even relay 24 will be energised in the first and ensuing odd open-circuit intervals and the charging period following them but not in the second and ensuing even intervals and charging period following them.

The time comparator circuit 147, which is shown in FIG. 1A, comprises a capacitor 148 which is arranged to be alternately charged and discharged, or more precisely discharged and then charged, through a constant-current transistor 149. The latter has its base connected to the negative supply terminal 41 through a zener diode 150 and through resistors 151 and 152 to the positive supply terminal 133. Its emitter is connected through resistors 153 and 154 to the negative supply terminal 41 thereby giving a constant current network of known type, in which the current will be controlled so as to balance the voltage across the emitter resistors 153 and 154 against that of the zener diode 150.

The capacitor 148 has one terminal, that shown as the upper terminal in the diagram, which will be so referred to purely for purposes of identification, connected to the contact 24/2 by which it can be connected either to the positive supply terminal 133 or through a contact 23/2 to the collector of the constant current transistor 149. The other or lower terminal of the capacitor 148 is connected to a contact 24/3 by which it can be connected either to the negative supply terminal 41 or to the collector of the constant current transistor 149. Thus with the contacts in the position shown the capacitor will charge up at constant current to the voltage of the voltage stabilised supply (i.e. the zener diode 132) minus that of the zener diode 150. When the odd-even relay 24 is energised, switching over the contacts 24/2 and 24/3, the capacitor 148 will discharge, again at constant current, to the voltage of the zener diode 150.

The resistor 154 is shunted by a contact 24/4 of the odd-even relay 24 so that in odd open-circuit intervals, when this relay is energised and the contact 24/4 closed, the discharge current of the capacitor 148 is slightly greater than its charging current in even intervals. This gives the required difference of X percent in the comparison of the duration of successive open-circuit intervals.

When the battery 21 is first connected, the contacts are in the positions shown, and the capacitor 148 charges up during the first battery charging period to a maximum voltage equal to the difference between the voltages of the zener diodes 132 and 150, and remains at this level.

At the beginning of the first open-circuit interval the odd-even relay 24 is energised and the capacitor discharges as described. During each charging period the charge relay 23 is energised and the contact 23/3 is opened. This makes no difference to capacitor charging, which can continue during the battery charging period following an even open-circuit interval, but opens the discharge circuit to prevent capacitor discharge in the battery charging period following an odd open-circuit interval.

The lower terminal of the capacitor 148 also provides an output to the capacitor voltage level detector circuit 160 for the time comparator circuit 147.

The capacitor voltage level detector circuit 160, which is shown in FIG. 1A, is a high-resistance circuit comprising two pairs of transistors 161 and 162, and 163 and 164 each pair having the emitter of one connected to the base of the other and their collectors connected together while the emitters of the two pairs share a common emitter resistor 165. The collectors of the transistors 163 and 164 are connected directly to the positive supply terminal 133 and those of the transistors 161 and 162 are connected thereto through a resistor 166.

The base of the transistor 164 is connected to the lower terminal of the capacitor 148. The base of the transistor 161 is connected through a transistor 167 and a resistor 168 to the negative supply terminal 41, the base of the transistor 167 being connected to the junction between the resistors 152 and 151. A capacitor 169 is connected between the base and collector of the transistor 161.

The phase two change over logic circuit 175, which is shown in FIG. 1A, includes a transistor 176 having its base connected to the collectors of the transistors 161 and 162. The transistor 176 has its emitter connected to the positive supply terminal 133 and its collector connected through a resistor 177 to the negative supply terminal 41. Its collector is also connected through a resistor 178 to the base of a transistor 179 having its emitter connected to the positive supply terminal 133 and its collector connected through a contact 23/4, a diode 180 and a resistor 115, by way of a conductor 187, to the base of a transistor 116 in the phase two latch circuit 114, shown in FIG. 1C.

Thus, when the right hand transistors 163 and 164 conduct the left hand transistors 161 and 162 cut off, the transistor 176 also cuts off and the transistor 179 conducts if the contact 23/4 is closed, and supplies a positive signal to the transistor 116 in the pahse two latch circuit.

As indicated above, at the beginning of the first open-circuit interval the capacitor 148 is in an initial, fully charged, state with the upper terminal at positive supply terminal voltage (say +20 volts) and its lower terminal at the voltage of the zener diode 150 say 3 volts.

The right hand input 164 of the comparator is at the latter voltage while the left hand half is anchored at a slightly more positive voltage corresponding to the drop in the resistor 151, say 0.1 volt. During the first open-circuit interval, (and subsequent odd intervals) the odd even-relay 24 is energised, connecting the variable right hand input 164 of the comparator through the contact 24/3 to the negative supply terminal so that it cuts off and passes no signal to the phase two latch circuit.

The capacitor discharges at a constant current.

In the ensuing charging period the contact 23/3 opens so that further discharge is prevented.

In the second open-circuit interval (and subsequent even intervals) the odd even-relay 24 is deenergised as shown. The capacitor is partially discharged so that its lower terminal (and hence the right hand input of the comparator) is nearer to the positive supply voltage than in the initial fully charged condition so that the right half of the comparator is conducting and the transistor 179 would conduct were it not that the contact 23/4 of the charge relay is open.

During this second (or any even) interval the capacitor steadily recharges towards its initial state, and if the duration of the even interval exceeds that of the preceding odd interval by X percent or more its lower terminal and the right hand input of the comparator, will have become more negative than the left hand input, and the transistor 179 will have cut off, before the end of the interval. Hence when the next charging period begins and the contact 23/4 closes there will still be no signal to the phase two latch circuit.

On the other hand if the duration of an even open-circuit interval does not exceed that of a preceding odd open-circuit interval by more than the chosen X percent, the capacitor 148 will not have charged up enough to cause the right hand half 163,164 of the comparator 160 to switch off by the end of the interval, when the battery voltage level detector 55 causes energisation of the charge relay 23 and closing of the contact 23/4. In this event the transistor 179 would be conducting with the contact 23/4 closed, and the phase two changeover logic circuit 175 would pass an output through the diode 180 to the phase two latch circuit 114 to initiate phase two.

It should perhaps be pointed out that, at the beginning of an even open-circuit interval, it is essential for the contact 23/4 to open before the contacts 24/2 and 24/3 complete their changeover, to avoid premature introduction of phase two. This is simply achieved by operating both relays from the charge timer unijunction transistor 86, since the contact 23/4 will open at the beginning of its travel, whereas the contacts 24/2 and 24/3 will only reclose at the end of their travel.

In the phase two latch circuit 114, which is shown in FIG. 1C, the phase two first latch relay 25 is connected in series with a resistor 117 and the transistor 116 and resistor 118 across the supply terminals 40 and 41.

The collector of the transistor 116 is also connected through a diode 119 and a holding contact 25/4 of the phase two first latch relay 25 so that as soon as this relay is energised it will close its own holding circuit.

The emitter of the transistor 116 is also connected through a diode 120 to the junction between a resistor 121 and a thyristor 122 connected across the supply terminals 40 and 41. The gate of the thyristor 122 is connected through a resistor 100 to the negative base of the unijunction transistor 86 of the charge timer 85. The resistor 118 does not pass sufficient current to energise the relay 25 and such energisation only occurs when the thyristor 122 is conducting. When this occurs the phase two first latch relay 25 is energised.

The thyristor 122 is fired by a pulse from the unijunction transistor 86 of the charge timer at the end of the first charging period and continues to conduct (through the resistor 121) thereafter.

It is, however, possible that the supply might be temporarily interrupted in which case the holding circuit of the contact 25/4 would be broken, and, on resumption of the supply, the charger would revert to phase one rather than continuing with phase two. Accordingly the phase two second latch relay 26 is provided and is connected by the conductor 188 through the diode 29 and the resistor 30, shown in FIG. 1B and already referred to, to the positive terminal 19 of the battery 21 and through a diode 123 (shown in FIG. 1C) to the contact 25/4 which is shunted by a holding contact 26/1 of the phase two second latch relay 26. Accordingly, as soon as the holding contact 25/4 closes, it will also energise the relay 26 from the battery 21 and close the holding contact 26/1. Thereafter if the alternating current supply should be momentarily interrupted the relay 26 will remain energised from the battery and maintain a holding circuit for the relay 25 to be re-energised as soon as the alternating supply is resumed.

Accordingly the time comparator circuit 147 and its voltage level detector circuit 160 will energise the phase two relays 25 and 26 when one open circuit interval does not substantially exceed in duration the previous open circuit interval.

It will be noted that the operation of changing over to phase two depends on an even open-circuit interval being insufficiently long to recharge the capacitor 148 to the chosen high limit. If the open-circuit intervals become so long that an odd one is more than sufficient to discharge the capacitor down to low limit, the even one (even if no longer than the preceding odd one) may then be sufficient to recharge it to the chosen high limit, and the circuit so far described would never initiate phase two.

A maximum time switch circuit 137, which is shown in FIG. 1A, is provided as a precaution against this. This comprises a zener diode 138 connected in series with a resistor 139 across the supply terminals 133 and 41. Their junction is connected to the emitter of a transistor 140 having its base connected to the emitter of a transistor 141 while the collectors of both these transistors are connected through a diode 181 (shown at the left of FIG. 1A) to the negative terminal of the diode 180 representing the output from the phase two changeover logic circuit 175. The base of the transistor 141 is connected through a diode 142 to the upper terminal of the capacitor 148. Accordingly if at any time the upper terminal of the capacitor 148 becomes more negative than a certain voltage determined by the zener diode 138 the transistors 141 and 140 will conduct and pass an output to the transistor 116 of the phase two latch circuit 114 and initiate phase two. Thus if at any time an open circuit interval has lasted so long that the capacitor 148 has become discharged beyond a certain point, irrespective of the relationship between the duration of one interval and another, the maximum time switch will deliver a signal to the phase 2 latch circuit 114 to initiate phase 2.

What we claim as our invention and desire to secure by Letters Patent is:

1. Automatic electric battery charging apparatus, comprising: means for temporarily interrupting the charging current during open-circuit intervals, the duration of each of said open-circuit intervals depending on the fall of battery voltage during the open-circuit interval, means responsive to the duration of the open-circuit intervals including a capacitor, means for alternately charging and discharging said capacitor during successive open-circuit intervals from a predetermined limiting state in one direction and means for detecting if said capacitor returns to said limit to initiate termination of at least a phase of the charging of said battery.

2. Apparatus as claimed in claim 1 in which the limiting state of charge of said capacitor is a high limit, and the termination of charge thereof is initiated if said capacitor, having been partially discharged in one open-circuit interval, fails, during the next open-circuit interval, to be recharged to said high limit.

3. Apparatus as claimed in claim 2 in which said capacitor is charged and discharged through at least one constant current device.

4. Apparatus as claimed in claim 3 in which capacitor is charged and discharged through the same constant current device.

5. Apparatus as claimed in claim 4 in which said capacitor has terminals respectively connected to the common terminals of a two-pole (odd-even) two-way switching device occupying different positions in alternate open-circuit intervals, whereof the first contact of the first pole and the second contact of the second pole are connected respectively to first and second supply terminals, while the second contact of the first pole and the first contact of the second pole are connected through said constant current device to said second supply terminal, and the connection of the former contact to said constant current device includes a contact which is open during charging periods.

6. Apparatus as claimed in claim 1 further comprising a maximum time switching circuit serving to initiate termination of the capacitor charge if the duration of an open-circuit interval exceeds a predetermined maximum irrespective of the ratio between the durations of successive open-circuit intervals.

7. Apparatus as claimed in claim 6 in which said maximum time switching circuit responds to said capacitor being discharged beyond a predetermined minimum limiting state of charge.

8. Apparatus as claimed in claim 3 in which the voltage level of said capacitor is detected by a balanced voltage level comparator including a long-tailed pair of transistor stages, whereof one side is fed from said capacitor connected to a constant current device including a transistor, while the other side is fed from a circuit including a similar transistor connected to a constant voltage source.

9. Apparatus as claimed in claim 1 further comprising a charge switching device for switching off the charging current at the end of each of a series of timed charging periods, and for switching said charging current on and to terminate the open-circuit interval when the open-circuit battery voltage falls below a predetermined value.

10. Apparatus as claimed in claim 1 further comprising a bistable switching device arranged to assume one state during a bistable switching device arranged to assume one state during odd open-circuit intervals and the other state during even open-circuit intervals.

11. Apparatus as claimed in claim 10 in which said bistable circuit includes a thyristor in parallel with a transistor and both in series with a relay having a change-over contact arranged to change-over an input pulse-signal from the thyristor gate, where it causes the signal to fire said thyristor, to the transistor base, where it causes said transistor to short-circuit and cut-off said thyristor.

12. Apparatus as claimed in claim 10 in which said bistable switching device is controlled by signals emitted by a charge timer at the end of each timed charging period, successive signals serving to switch said bistable switching device in opposite directions, while said charge switching device is also controlled by signals from said charge timer which always switches said charge switching device in the same direction, intervening signals being received from a voltage comparator to switch said charge switching device in the opposite direction.

13. Apparatus as claimed in claim 12 in which said voltage comparator includes a Schmitt trigger circuit.

14. Apparatus as claimed in claim 10 in which said bistable switching device connects said capacitor to a constant current network and to a supply so as to be charged or discharged in one direction from its limiting state during odd open-circuit intervals, and in the opposite direction towards said limiting state during even open-circuit intervals.

15. Apparatus as claimed in claim 9, in which said charge switching device is arranged to switch off said capacitor charging or discharging circuit during charging periods when said capacitor is discharging from said limiting state but not during charging periods when said capacitor is charging to said state.

16. Apparatus as claimed in claim 9 in which said charge switching device controls said means for terminating a phase of the charge so that it can only occur during a charging period.

17. Apparatus as claimed in claim 16 in which said means for terminating a phase of the charge are controlled by a switching device.

18. Apparatus as claimed in claim 17 in which said switching device is a thyristor switched on by said charge timer at the end of the first charging period to prevent said charge timer from functioning during that period but permitting said charge timer to function subsequently.

19. Apparatus as claimed in claim 18 in which said battery charge timer includes a unijunction transistor having its input coupled to a resistor capacitor network.

20. Apparatus as claimed in claim 1 in which the termination of a phase of the charge is under the control of a latching circuit including a first latching relay energised from an A.C. supply and having a holding contact, and a second latching relay energised from the battery and having a holding contact in parallel with said first latching relay.

21. Apparatus as claimed in claim 1 in which the termination of the first phase initiates a second phase during which, as in the first phase, charging current flows for predetermined periods at the end of each of which said charging current is switched off for an open-circuit interval which terminates when the open-circuit battery voltage falls below a predetermined value, the average charging current being substantially less than in the first phase.

22. Apparatus as claimed in claim 21 in which during the second phase the time of a charging period is less than that in the first phase, and is controlled by the same timer in which the value of a component in a resistor capacitor network is changed.

23. Apparatus as claimed in claim 22 in which the level of voltage is less than in the first phase and is controlled by the same battery voltage level detector in which the value of a component is charged.

24. Apparatus as claimed in claim 1 further comprising a relay for switching on said A.C. supply only when a battery is connected to said charging terminals.

25. Apparatus as claimed in claim 24 including a switch on delay circuit to delay the switching on of the A.C. supply to allow time for a charging plug to be pushed fully home before charging begins.

* * * * *

UNITED STATES PATENT OFFICE
CERTIFICATE OF CORRECTION

Patent No. 3,761,795    Dated September 25, 1973

Inventor(s) Dennis A. Clayton et al

It is certified that error appears in the above-identified patent and that said Letters Patent are hereby corrected as shown below:

[30] Foreign Application Priority Date

January 14, 1971   Great Britain   No. 1822/71

Signed and sealed this 2nd day of April 1974.

(SEAL)
Attest:

EDWARD M. FLETCHER, JR.
Attesting Officer

C. MARSHALL DANN
Commissioner of Patents